(12) United States Patent
Berson

(10) Patent No.: US 6,532,459 B1
(45) Date of Patent: Mar. 11, 2003

(54) SYSTEM FOR FINDING, IDENTIFYING, TRACKING, AND CORRECTING PERSONAL INFORMATION IN DIVERSE DATABASES

(75) Inventor: William Berson, Weston, CT (US)

(73) Assignee: Berson Research Corp., Weston, CT (US)

(*) Notice: Subject to any disclaimer, the term of this patent is extended or adjusted under 35 U.S.C. 154(b) by 0 days.

(21) Appl. No.: 09/459,446

(22) Filed: Dec. 13, 1999

Related U.S. Application Data

(60) Provisional application No. 60/112,392, filed on Dec. 15, 1998.

(51) Int. Cl.$^7$ ............................................. G06F 17/30
(52) U.S. Cl. ...................................................... 707/3
(58) Field of Search ............................................ 707/3

(56) References Cited

U.S. PATENT DOCUMENTS

| | | | | | |
|---|---|---|---|---|---|
| 5,636,346 | A | * | 6/1997 | Saxe | 705/1 |
| 6,078,914 | A | * | 6/2000 | Redfern | 707/2 |
| 6,092,086 | A | * | 7/2000 | Martin et al. | 707/202 |
| 6,102,969 | A | * | 8/2000 | Christianson et al. | 707/10 |
| 6,141,694 | A | * | 10/2000 | Gardner | 279/101 |
| 6,161,090 | A | * | 12/2000 | Kanevsky et al. | 704/246 |
| 6,169,986 | B1 | * | 1/2001 | Bowman et al. | 707/10 |
| 6,249,252 | B1 | * | 6/2001 | Dupray | 342/357.01 |
| 6,260,020 | B1 | * | 7/2001 | Ruffin et al. | 705/1 |
| 6,266,668 | B1 | * | 7/2001 | Vanderveldt et al. | 706/15 |
| 6,298,382 | B1 | * | 10/2001 | Doi et al. | 709/105 |
| 6,401,118 | B1 | * | 6/2002 | Thomas | 707/4 |

* cited by examiner

*Primary Examiner*—Wayne Amsbury
(74) *Attorney, Agent, or Firm*—John V. Stewart

(57) ABSTRACT

A system implemented with user software, running either stand-alone or in conjunction with a web site and central server, that enables a user to input identifying information about himself, and then be guided through a methodical process to find personal information regarding himself in various external databases on a network such as the Internet. Once records about the user have been located at a database, the system, upon authorization by the database owner, may be used to access that database, to the extent possible, subject to the restrictions of the owner, and to erase, modify, or correct the pertinent personal data found therein. Thus, an individual is provided with a system for finding, accessing, and searching external databases containing information of interest and particularly personal information of interest that may be inaccurate and can be corrected.

2 Claims, 3 Drawing Sheets

SYSTEM FOR FINDING, IDENTIFYING, TRACKING, AND CORRECTING PERSONAL INFORMATION IN DIVERSE DATABASES

CLAIM OF PRIORITY BASED ON CO-PENDING PROVISIONAL APPLICATION

The present application is related to the co-pending Provisional patent application No. 60/112,392 of William Berson, filed Dec. 15, 1998, entitled "A System For Finding, Identifying, Tracking, and Correcting Personal Information in Diverse Databases", and based on which priority is herewith claimed under 35 U.S.C. 119(e) and the disclosure of which is incorporated herein by reference in its entirety.

BACKGROUND OF THE INVENTION

1. Field of the Invention

The present invention relates generally to computer network search systems, such as Internet search systems, and, more particularly, to a system for finding, identifying, tracking, and correcting personal information about an individual that is held in diverse databases on computer networks.

2. Prior Art

The rapid growth of computer networks with accessible databases has spawned a large number of search systems for finding and accessing databases with information on topics of interest. One result of this phenomenon is that the privacy and security of personal information compiled by governments, businesses, institutions, and others, in databases on computer networks, such as the Internet, can effect the lives of individuals in ways often unknown to and beyond the control of the individuals themselves. Such personal information during its compilation is subject to varying degrees of quality control, restraint, and accuracy. For example, personal information relating to many individual persons, such as health information, social security number, bank accounts and financial data, military records, and the like, is presently entered into and held in a variety of databases, often or even typically without the consent or knowledge of the particular individuals to whom it relates. This information is traded, sold, processed, corrupted, repackaged, transmitted, and stored, and used by unknown parties in various ways which are usually unauthorized by these individuals. An individual's identity may be "stolen", with criminal intent, by persons seeking to misrepresent themselves as the individual, thereby corrupting or otherwise misusing personal information held about the individual without the individual's knowledge.

People, therefore, have an interest in uncovering, checking, correcting, and deleting database records containing their personal information. Database owners, on the other hand, have an interest in safeguarding the integrity of their databases, inhibiting unauthorized or unwanted access, correcting errors, and in complying with the law.

Although in various venues there are laws, policies, and regulations for restricting the collection and use of such personal information, as well as procedures for finding, correcting, and deleting such records, there is no single tool available to a person for achieving these desirable results. Typically, an individual may send a mail request to a database owner, or become a subscriber, to obtain a report of the latest personal information in the database. However, as the information may be resident in a large number of databases, most people may become aware of an extant record, or misuse of their personal information, or criminal misappropriation of their identities, only after suffering inconvenience, economic loss, or other undeserved penalty. Moreover, database owners have substantial costs in connection with the maintenance, correction, and use of their databases and are at risk for civil, and in some cases criminal, penalties for misuse and/or errors in their data.

Problem to be Solved:

Consequently, there is a need for a system that will enable a person to effectively search databases on computer networks for personal information of interest and particularly to determine what information about himself or another is being held in various external databases, and that will permit him to interact with a database, and its owner if necessary, to update, delete, or correct the personal information to insure its accuracy.

Object:

It is therefore an object of the present invention generally to provide a person with a system for searching external databases containing information of personal interest and to enable the person to interact with the databases regarding changing such information when found.

It is a further object of the invention to provide a system for use by an individual that enables him to search, find, identify, track, and correct personal information about himself that is held in diverse external databases on computer networks, such as the Internet.

SUMMARY OF THE INVENTION

The foregoing and other problems are overcome and the objects of the invention are realized by methods and apparatus in accordance with embodiments of the present invention. Accordingly, the invention involves a system that may be implemented with user software, running either stand-alone or in conjunction with a web site and central server, whereby the user inputs various personal identifying information about himself or another, such as social security number, date of birth, driver's license number, address, etc., and then is guided through a methodical process to find personal information about himself or the other person in various external databases. These databases may include, but are not limited to, state drivers license records, forensic records held by state and federal authorities, medical, insurance, and health provider databases, and commercial databases established by businesses. Although it is not the primary focus of the invention, data collected and held by Internet web sites, service providers, and e-mail recipients may also be included. Once records about the user or other have been located at a database, the system, upon authorization by the database owner, may be used to access that database, to the extent possible, subject to the restrictions of commercial agreements, legal remedies, and administrative policies of the data holders, and to erase, modify, or correct the pertinent personal data found therein. Thus, an individual is provided with a system for searching, finding, identifying, and tracking external databases containing information of interest and particularly personal information about himself that may be inaccurate, which system enables the individual to correct inaccurate personal information that is held in diverse external databases on computer networks, such as the Internet. Similarly, an individual may use the system to coordinate the records of another to whose personal information he is privy. While the system of the invention may be implemented by individual computer software, in view of the desirability of the cooperation of many database owners, it is advantageous that a website or server owner with appropriate database permissions operate a central server with the searching and interacting capabilities of the invention, for the use of subscribers.

BRIEF DESCRIPTION OF THE DRAWINGS

The above set forth and other features of the invention are made more apparent in the ensuing Detailed Description of the Preferred Embodiment when read in conjunction with the attached Drawings, wherein.

DETAILED DESCRIPTION OF THE PREFERRED EMBODIMENT

Figure 1:
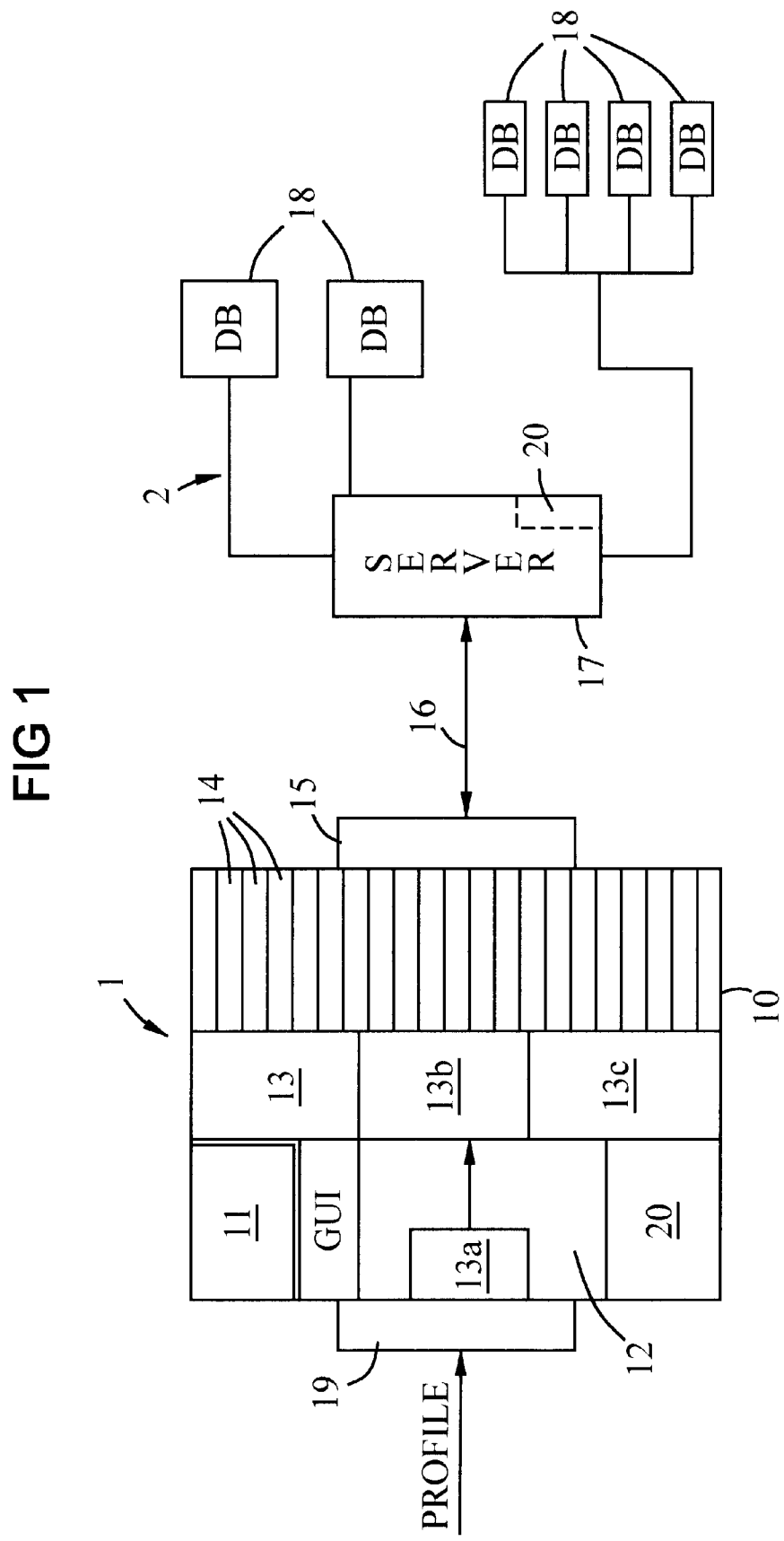
FIG. 1 is a block diagram of a system in accordance with the present invention.

The present invention in its preferred embodiment presents a method and means whereby a system is provided, preferably involving user software running either stand-alone or in conjunction with a web site and central server, that enables a user to input various personal identifying information, such as social security number, date of birth, driver's license number, address, etc., and be guided by the system through a methodical process for finding information about himself in various external databases. Once an appropriate database has been found, the system of the invention may be used to track, inspect, check, erase, modify, or correct the pertinent personal data found in the database with the agreement of the database owner. In view of the expanded utility of the system that is achievable by securing the cooperation of many and diverse database owners, it is advantageous that the invention be practiced by website or server owners or administrators with appropriate database clearances that provide a central server with the searching and interacting capabilities of the invention, for the use of subscribers. Subscribers, while typically individuals seeking personal information and records about themselves, may also include people involved in various forms of record-keeping where accurate personal information is important.

To facilitate a clear understanding of the description below, the following definitions are set forth:

The individual—a person who is a customer for the system of the invention seeking his own or another's personal records for checking accuracy or content, and in certain cases a corporation, or other commercial entity, or any agency wishing to monitor or uncover database records relating to it.

Information of Interest—data relating to the individual, specifically personal data such as medical records, purchasing records, interests, demographics, legal records, educational records, etc., which has been gathered with or without the express consent or knowledge of the individual.

External databases—databases created and maintained by third parties, such as government entities, commercial enterprises, advertisers, and mailers, which databases contain information of interest.

Database owner—a third party who "owns" or otherwise controls an external database and access to it, e.g., a database owner would be TRW or a state motor vehicle department.

Search protocols—procedures for identifying which external databases are likely to contain the information of interest, and which procedures may be both analytical and heuristic.

Access protocols—procedures for accessing information of interest in external databases, derived from governmental regulations, policies, and procedures of database owners, and commercial practice.

An exemplary system in accordance with the present invention may consist essentially of user software at a user terminal, a central processing server coupling the terminal to a database network, and appropriate procedures and database protocols and business relationships, through which a service can be provided to an individual user who wishes to uncover, correct, modify, or delete personal data about himself that resides in the diverse external databases maintained by others on the network. While the system is capable of direct access between a user terminal and a database, it is contemplated that, given the current volume of available databases and their security considerations, in most instances the system will not have direct access to the external databases uncovered, so that it will also provide the capability to create inquiries and requests for changes in the external databases. The system provides a single user interface and point of entry into multiple, diverse databases on a network. Protection for both the individual and the database owner is built into the system through the established protocols, so that the individual is assured that no unknown party has accessed or changed his record or information of interest, and the database owner is assured that the individual seeking information is genuinely the person he purports to be, and that legal and procedural safeguards have been properly complied with. Inasmuch as the location of the information of interest, it's contents, format, and currency vary continuously, the invention employs a probabilistic and heuristic model for searching, assessing, and verifying. The invention also includes a *capability for determining fees based upon information content, location, and database ownership.

In general, a system in accordance with the invention consists of the following operating elements:

1. A User Interface—the means through which an individual accesses and uses the system, such as the keyboard of a personal computer or including the computer with appropriate software.

2. A Database List and Predefined Interface—a list of external databases compiled on the basis of those likely to contain information of interest, with each listed external database being accessed via a predefined interface provided by the system. In the case where a commercial relationship has been established between the system and an external database owner, then the predefined interface will consist of a predefined private interface. An example of such an interface would be a datalink via a network directly into the external database, honoring the predetermined access protocols for read, and in some cases write, privileges into the database.

In the case where no commercial relationship has been established between the system of the invention and an external database owner, then the predefined interface will consist of a public interface, access through which is determined by law, business policy, or commercial practice. An example of such an interface would be one for handling a freedom-of-information-act request for the database consisting of FBI files. For this purpose the invention may include a report generator which creates a standard. freedom-of-information-act (FOIA) request printed according to governmental standards, together with an appropriate envelope and postage, correctly addressed to the governmental office established to honor such requests.

3. Access Protocols—a set of procedures by means of which an individual can access information in an external database and cause it to be read, corrected, modified, or deleted. These protocols may include direct access through software and a network connection, and indirect access by means of letters, notifications, third parties, and other off-line means. Access protocols are dictated by law, commercial policies, and the internal procedures of the database owners or holders. An important feature of the system of the invention is the development of a knowledge base of access protocols and a single entry point for them.

4. Security Protocols—the means through which an individual is reliably identified before access is granted to an external database. Such means can include an electronic identification system such as one using biometric identifiers (fingerprints, retinal scans), electronic notary, smartcardbase identification, etc. The security protocols are designed to provide a numerical rating which reflects a variable level of confidence in the identity of an individual requesting access. Each database owner normally sets a desired level of confidence that is required for access to the personal information of interest, according to its policies and procedures, the nature of the inquiry, and nature of the requested data. For example, an inquiry resulting in the disclosure of publicly available information, such as a listed telephone number, can require only a low level of confidence originating with the individual's simple assertions of his identity. An inquiry including a request for medical records can require a high level of confidence originating with a notarized signature, corroborated with a mother's maiden name. The access protocols contain the unique requirements in this regard of each database owner.

5. Authentication Data—the means, in the form of encrypted information which is communicated by the system to the database owners, that contains the identity of an individual requesting access and the result of the security protocol process. The authentication data contains the identification information for the individual, such as his social security or driver's license number, his address, his employer, and other identification factors. In addition, the authentication data contains a code indicating the origin or source of the original information, together with a numeric value indicative of the level of confidence or trust in the source. The date of the source's reference, employee or other personnel involved, and other information regarding the circumstances and conditions of the reference are included. This authentication data when first created may be signed with a digital signature using an encryption key provided by the source, if such a service is available. The digital signature and encryption scheme may use public key encryption or another encoding method. By means of associating the authentication data with the identification information and conveying them together, various parties to the transactions described above are assured that information is transmitted only to parties entitled to receive it.

6. Search Protocols—the means through which the external databases are searched for information of interest. Search protocols are unique to each database and a list of the appropriate protocols is created and maintained by the system.

7. Heuristic Algorithms—the set of specific procedures and techniques used in the search protocols. The following steps are followed:

I. A profile of an individual is constructed based on information supplied by the individual, and the demographics of the inquiry situation.

II. An initial list of target databases is assembled and inquiries made through predefined interfaces using the access protocols.

III. Based on the number of "hits" among the target databases and the quantity and quality of information received, a revised list of databases is created. The quality of information is assessed with a numeric rating based on the number of references, links to other data sources, age of the data, reliability of the database owner, reliability of the database, and other measures.

IV. Inquiries are made to the revised list of databases through the interfaces using the access protocols.

V. If the desired quantity of information has been received, or, if a predetermined number of iterations has been reached, the iterative process is terminated, otherwise it begins again at step III.

VI. If incorrect or inconsistent data is obtained, or some other forensic alarm occurs, then the process is terminated and a special message generated. An example of such a case would be if the database contains key identification information, such as a social security number, that is correct, but other information that is a mismatch, such as a driver's license number.

8. A User Interaction Capability—the means that provides an individual the capability to interact with the system, which means is achieved by adapting the User Interface to receive the special message generated when incorrect or inconsistent data is detected or other alarm occurs, and, in response, to provide the user direct access to the database and data record in question, given the requisite approvals and protocols, in order to make any necessary alterations to the data therein. In the absence of the requisite approvals and protocols, indirect access may be achieved by means of a suitable report generator or like program that will produce a signal or document for sending notice to the database owner.

A particular embodiment of a system in accordance with the invention may be set up and operated as shown in FIG. 1. Referring to the Figure, it will be seen that a user station or interface 1 including, for example, a personal computer 10 with a viewing screen 11 and memory 12, is provided with a database list 13 and a set of predefined interfaces 14 for the list, in the form of computer software designed to accomodate the list and implement the list interfaces by storing personal, database, and protocol information and outputting commands and executing appropriate algorithms. The computer output is connected, e.g., through a modem 15, by a transceiving line 16 and a central server 17 to a network 2, such as the Internet, affording access to a large number of diverse databases 18 that may contain personal information about an individual who will be a system user or who will be of interest to a system user.

In particular, the user station 1, or computer 10, may be provided with the following functional modules:

(1) A graphic user interface (GUI), coupled to viewing screen 11, the software for which may be downloaded from an Internet site or purchased by the user;

(2) Public key secure data transmission protocols;

(3) Local data files 13a in memory 12 containing identification data as entered by the user for use with the general database list 13;

(4) Communications protocols; and (5) Public key secure transaction protocols for payments by a user to a system provider or central server administrator.

To cooperate with transmissions to and from the user interface 1, the central server 17 may be provided with the following functional modules:

(1) User interface protocols;

(2) An authentication "engine" for the authentication process detailed above;

(3) A database owner interface;

(4) A database memory;

(5) Accounting routines, containing customer account registers maintained by the system provider or server administrator;

(6) Secure financial transaction protocols;

(7) Communications security (firewall); and (8) A database (knowledge base) of database owners' interfaces, protocols, requirements, and fees.

Communication between the central server 17 and external clients such as the database (18) owners, users, and others may be via Internet, direct connection, EDI (electronic data interchange) or other means.

An individual who is interested in using the system of the invention for accessing personal information in various databases on the network 2, first prepares a personal profile, including personal identifying data and the demographics of the inquiry such as the type of personal information that is being sought and the type of databases in which it will probably be found. The completed profile 13a is input to the system by entering it into the computer 10 by means of a keyboard or other user interface 19. The computer 10 stores the general list 13 of available databases, along with respective access, security, and search protocols and authentications for the listed databases, which protocols and authentications make up the predetermined interfaces 14 for the databases listed. The database list 13 may be keyed to the profile information 13a input by the user to automatically compile an initial target list of databases 13b to be accessed. Also, the user may select particular databases to be included from the general list 13, by entering a selection, and, if the appropriate protocol and other information is known by the user, he may enter a database listing and interface not in the general list. Thus, an initial target list of databases 13b may contain all or a mix of automatically compiled databases, selected databases, and specially entered databases.

Once an initial list 13b of target databases is assembled along with their respective predefined interfaces 14, a user may initiate tracking inquiries of the appropriate databases 18 on the network 2 through the predefined interfaces 14, modem 15, transceiving line 16, and server 17, using the databases' access protocols and the personal profile information. As a result of the initial inquiries and the information obtained in response thereto through the server 17 and transceiving line 16, a revised list 13c of databases may be created in memory 12 based on the number of "hits" among the initial target databases and the quantity and quality of information accessed therein. The revised list 13c is determined by assessing the quality of information found in a database 18 and assigning a numeric rating based on the number of references, links to other data sources, age of the data, reliability of the database owner, reliability of the database data, and other relevant criteria.

Inquiries may then be made to the revised list 13c of databases through the predefined interfaces 14, modem 15, line 16, and server 17, using their access protocols. Revisions and inquiries using the foregoing criteria may be repeated until the desired quantity of information has been received, or a predetermined number of inquiry iterations has been reached, whereupon the iterative inquiry process is terminated.

If during the iterative inquiry process, incorrect or inconsistent data is obtained, or some other forensic alarm occurs, then the process may be suspended and a special message generated. An example of a case for which a special message or alarm would be generated is when a database being accessed contains key identification information, such as a social security number, that is correct, but other information that is a mismatch, such as a driver's license number. At this point, the user can, if the proper agreement is in place with the database owner, make any necessary or desired change or deletion in the problematic data before again initiating the iterative inquiry process.

By adopting the foregoing system and procedure a user can develope a knowledge base 20 in the computer 10, or in the server 17, incorporating the list of databases of greatest interest to be accessed, along with their particular protocols and the pertinent database owner agreements required, to enable the user to monitor for accuracy the personal information about himself contained in these databases and available to other database users or subscribers. The knowledge base 20 may then be used periodically to check the latest personal information in the profile 13a to be sure of its accuracy and to make corrections, modifications, or deletions. In addition to serving the individual user, the system of the invention offers the owners of network databases 18 the capability of identifying the person making an inquiry and the assurance that the person making inquiry is properly authorized. The system also enables the individuals most knowledgeable and concerned to update and correct the information contained in the databases 18 so that database users or customers can be guaranteed that the information therein is current and reliable.

The procedures for finding, identifying, tracking, and correcting personal information about an individual in accordance with the invention are performed more specifically as follows.

Finding Personal Information in Diverse Databases:

Appropriate requests are generated to access databases, according to their owners' agreed-upon protocols, rules, and interfaces, in order to search out information about an individual based upon particular identifying data or information. The particular identifying information is a subset of a larger set of identifiers which are initially gathered by the system to identify the individual making the inquiry. A decision is made as to whether a data record found in the search does in fact apply to the individual in question by weighing the extent to which matches or 'hits' are obtained in one of the diverse databases with the identifying information. For example, the larger set of identifiers might include first name, last name, previous address, drivers, license number, data of birth, social security umber, employer ID number, etc. A weighting factor is assigned to each identifier depending on the particular kind of inquiry, the depth of investigation desired, and the number of previous matches or some other factor. A score is generated which determines whether the information is in fact 'found' and should be associated with the individual in question.

Identifying Personal Information in Diverse Databases:

Personal information is identified by associating the individual in question with the data record in order to:

(1) assure that the information located relates to the individual; and (2) authenticate the identity of the individual in question (who may be the originator of the inquiry, or who may not) to the satisfaction of the database owner or other party, which authentication results in the creation of an "authentication data file" containing the results of the authentication, and is achieved by any or all of the following:
  a. the initial gathering of the larger set of identifiers detailed above;
  b. verification of the consistency of the identifiers as detailed above;
  c. comparison of the identifiers with a previously collected set of "suspect" identifiers that are related to known bad data records, falsifiers of data, previously inconsistent responses, etc.;
  d. verification of the self-consistency of the data records, e.g., names containing more than 4 consecutive consonants, a date of birth greater than 110 years previous to the search date, etc.; and
  e. other means and, then:
    I. a guaranty associated with the authentication is created by creating a digital signature of the "authentication data file";
    II. that digital signature is encrypted by private or public key encryption;
    III. that guaranty, with or without decryption keys, is transmitted to the database owner, or other party, according to a pre-established arrangement with the owner or that party.

Tracking Personal Information in Diverse Databases:

Once the preceding procedures for finding and identifying information and individuals are in place, "tracking" consists of ongoing queries into the database to find new and changed information regarding the individual. An individual subscribing to the service may, for a fee, request periodic updates, updates upon the discovery of new or changed information or notification when updates are needed.

Correcting Personal Information in Diverse Databases:

The foregoing procedures provide a capability for finding information which is inconsistent, seemingly incorrect, or otherwise needing change, deletion, or modification. This desirable capability is achievable by invoking the guaranty of identity above, which assures the identity of the individual in question according to pre-agreed criteria to the satisfaction of the database owner. Upon discovery of information needing change, deletion, or modification, a system user may undertake the following actions:

(1) the creation of a report for the database owner;
(2) the creation of a report for the individual making the inquiry (possibly the individual in question);
(3) the initiation of a request for change, deletion, or modification which contains the action requested;
(4) the examination of the information contained in the request as a new data record to be examined for consistency with other records in the manner described above for all data records;
(5) the creation of a report for the database owner, containing the guaranty, the results of the data examination, a figure of merit score based on an assessment of the validity of the new data as determined above and a recommendation for action to be taken;
(6) the action taken or not by the database owner;
(7) the creation of a report by the database owner on the action taken; and
(8) the creation of a report to the individual making the inquiry.

Figure 2:
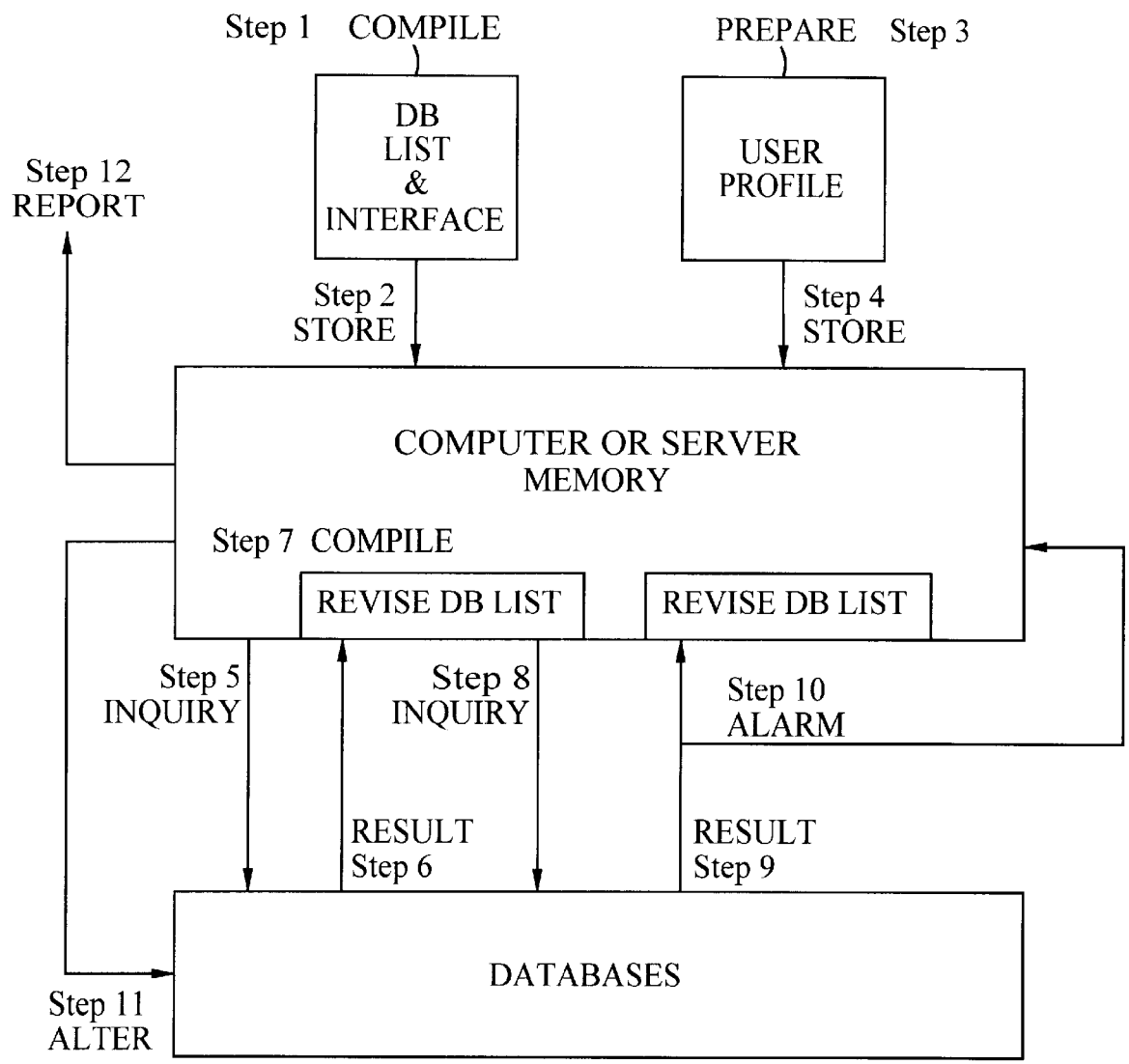
FIG. 2 is a flowchart illustrating a method of operation in accordance with the invention.

An illustrative example of the general procedures and techniques used in the search protocols is shown in the flowchart of FIG. 2 and involves the steps as follows.

In step 1, an initial list of target databases available on a network is compiled, and predefined interfaces are created for each database including access protocols to be used for making inquiries of the target databases. The initial target database list may be compiled from a stored general list of databases and interfaces, that has been prepared along with the appropriate access protocols, using a topical sort, or they may be personally selected from the general list by an individual who wishes to use the system, or such individual may enter additional databases and interfaces if he has the requisite information.

In step 2, the information on the initial list of target databases and interfaces is input to a user station, typically a personal computer, and/or to a central server, and stored in memory.

In step 3, an individual who is interested in using the system for accessing personal information in various databases on a network may be guided by the system software to prepare a personal profile, including personal data and the demographics of the inquiry such as the type of personal information that is being sought and where it might be found. The information in the profile may include elements that are keyed to information or characteristics found in the general target database list and enable the selecting of some of the databases for the initial list.

In step 4, the personal profile is input to a user station computer and stored in memory. This profile information may also be transferred to a central server containing the general database lists and interfaces or both may be stored in and used from the computer memory.

In step 5, the user may then be guided by the system software to make inquiries of the target databases on the initial list of target databases through the predefined interfaces, using the access protocols created for each, and drawing from information stored in the personal profile.

In step 6, the results of the inquiries are compiled in the memory including the number of "hits" among the initial target databases having information sought and the quantity and quality of information accessed therein.

In step 7, a revised list of databases is created in memory based on the number of "hits" among the initial target databases having information sought and the quantity and quality of information accessed therein. In particular, the databases on the revised list are determined by assessing the quality of information found in a database and assigning a numeric rating based on the number of references, links to other data sources, age of the data, reliability of the database owner, reliability of the database, and other specific criteria.

In step 8, inquiries are then made of the databases on the revised list of databases through their predefined interfaces using their access protocols.

In step 9, the revisions and inquiries of steps 7 and 8 are repeated until the desired quantity of information has been received, or a predetermined number of inquiry iterations has been reached, whereupon the iterative inquiry process is terminated.

In step 10, if during the iterative inquiry process, incorrect or inconsistent data is obtained, or some other forensic alarm occurs, then the process may be suspended and a special message generated. For example, a special message or alarm may be generated when a database being accessed contains keyed identification information, such as a social security number, that is correct, but other information, such as a birth date, that is a mismatch.

In step 11, if the inquiry process is suspended by an alarm, a user may investigate the cause of the alarm and take corrective action by accessing the database being queried and altering the data record that caused the alarm by finding, identifying, and correcting personal information found to be inaccurate or delete information that may be extraneous or false in the record.

In step 12, if access to the database containing the faulty record has not been authorized, then external procedures may be followed such as using a report generator in the computer to create a suitable request for access or for correction, along with printing an appropriate envelope and postage, for sending to the database owner in question.

Figure 3:
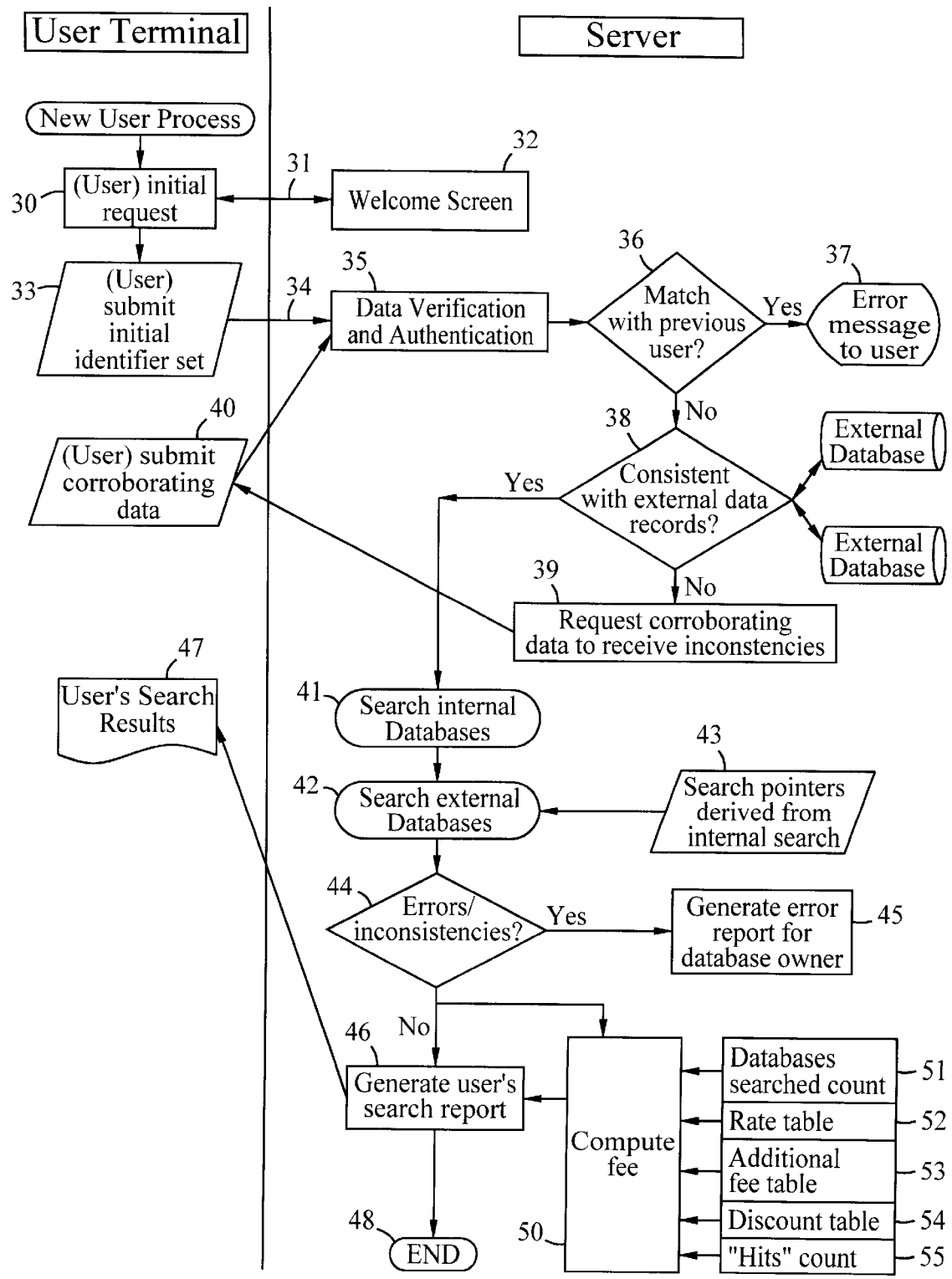
FIG. 3 shows in greater detail the interaction between a preferred user terminal and a central server in accordance with the invention.

FIG. 3 shows in some greater detail the interaction between a preferred user terminal and a server in accordance with the invention.

To begin with, a new user enters an initial search request (30) into the user terminal, which request is coupled (31) by the terminal to the server to key the activation of a welcome screen (32) for display at the terminal.

The user then inputs (34) the initial search request data with an identifier set (33) to the server where the data is verified and authenticated (35) as explained above. If there is a question regarding verification or authenticity, such as a match (YES) with a previous user having "suspect" identifiers (36), an error message (37) is sent from the server to the user terminal. If no question regarding a match is detected (NO), then the identifiers are checked (38) for consistency with external data records on external databases. If an inconsistency is found (NO), a request (39) for corroborating data is sent to the user terminal to resolve the inconsistencies. The user must then submit corroborating data (40) for further data verification and authentication (35–39).

If the initial request raises no questions regarding verification, authenticity, or consistency (YES), a search (41) is conducted of the internal databases in the server for the data sought. A search (42) is then conducted of the external databases on the network using search pointers (43) derived from the internal database search (41) and the external search proceeds in accordance with the reiterating techniques described above.

The results of the external database search (42) are checked (44) for errors or inconsistencies and if any are found (YES), an error report (45) is generated for the database owner. If the checking for defects proves to be negative (NO), a user's search report (46) is generated and sent to the user terminal to provide the user with the search results (47). Completion of the generation of the user's search report (46) signals the server to end (END) the search (48) for the data requested by the new user.

Conveniently, and to complete the pertinent information, prior to generating the user's search report (46), the fee for the search may be computed (50) and included in the report for forwarding to the user (47). For this purpose, a series of computation sources may supply appropriate information related to the searching process. By way of example, inputs may be provided relating to a count of the databases searched (51), a rate table (52), an additional fee table (53), a discount table (54), and a "hits" count (55), for the computation and adding (50) of the necessary fee information to the report (46).

It will therefore be seen that a system has been disclosed that may be implemented with user software, running either stand-alone or in conjunction with a web site and central server, that broadly enables a user to search for, find, identify, and track specific information of interest contained in records in a number of databases, which records can be checked for their accuracy and the information altered where necessary. In the preferred embodiment, a user may input information about himself and then be guided to find records with related information regarding himself in various external databases on a network. If a problematic record is found, and authorization by the database owner in which it is found has been obtained, the database may be accessed and the record erased, modified, or corrected. An individual is provided with a system for finding, identifying, and tracking external databases containing information of interest and particularly correcting personal information of interest that may be inaccurate. A knowledge base can be developed by a user with the list of databases of greatest interest to be accessed, along with their particular protocols and the pertinent database owner agreements required, so that the user can periodically monitor the personal information about himself contained in these databases and available to other database users or subscribers and make corrections, modifications, or deletions. The system also provides database owners with the capability to identify persons making inquiry and assure that the person making inquiry is authorized and to enable information update and correction so that database users or customers can be guaranteed that the information therein is current and reliable. A feature of the system of the invention is that information from databases maintained by diverse agencies or industries and for diverse purposes may be correlated and through such correlation, corrected.

While the invention has been particularly shown and described with respect to preferred embodiments thereof, it will be understood by those skilled in the art that changes in form and details may be made therein without departing from the scope and spirit of the invention. Given the preceding description of a preferred method and means for achieving the present invention, it will be appreciated that those of skill in the art will be enabled by this description to compile and assemble the desired and appropriate databases and determine the various protocols, code, and other features in order to produce the necessary combinations of software and hardware required to achieve a particular system and implement the carrying out of the invention.

What is claimed is:

1. A data access and authorization system for finding, checking, and maintaining personal information in diverse external databases on a data communications network, comprising a data communication network;

a plurality of diverse external databases of multiple owners and multiple access protocols connected to the data communication network, at least some of which external databases contain personal identification data and other privileged data for multiple respective users;

a data access terminal connected to the data communication network;

a computer system connected to the network, the computer system having an interactive user interface connected to the terminal;

a security protocol algorithm in the computer system for identifying a given user of the interactive terminal;

an external database table in the computer system that lists at least some of the external databases along with information on ownership, access protocol, security protocol, search protocol, data update procedure, and billing procedure for each listed database;

a table maintenance algorithm in the computer system that maintains the external database table by searching for personal identification data of the given user in a selected one or more of the external databases in the table, and interactively confirming a match of the personal identification data with the given user to a threshold score of certainty for the selected one or more of the external databases;

a table update algorithm in the computer system that searches the network for external databases containing personal identification data of the given user, interactively confirms a match of the personal identification data with the given user to a threshold score of certainty, and adds entries for external databases so confirmed to the table;

a personal information maintenance algorithm in the computer system with means for updating personal identification data and other personal information in a selected one or more of the external databases using the external database table for access, authorization, search, and update procedures.

2. A method for finding, checking, and maintaining personal information in diverse external databases on a data communications network, comprising:

a) providing a data access terminal connected to a data communication network;

b) providing a computer system connected to the network, the computer system having an interactive user interface connected to the terminal;

c) compiling an external database table in the computer system that contains a list of external databases on the network along with information on ownership, access protocol, security protocol, search protocol, data update procedure, and billing procedure for each listed database;

d) compiling personal identification data in the computer system via interaction between a user on the terminal and the computer system interface;

e) finding personal information in external databases on the network by searching a selected one or more of the databases listed in the external database table according to respective protocols in the database table for matches to at least some of the personal identification data;

f) identifying personal information in a selected one or more of the databases found to match in step e) by matching data therein to additional personal identification data interactively requested of the user by the data access terminal;

g) creating an authentication data file in the computer system containing indicators of exactness of the matches of personal identification data verified in steps e) and f);

h) transmitting a digital guarantee of the user's identity based on the authentication file to the selected databases of step f) in a format as required by respective security protocols in the database table;

h) tracking the personal information in the diverse databases found on the network by automatically periodically checking the personal identification data in the computer system against corresponding data in the selected external databases of step f) for changes and inconsistencies; and i) correcting personal information in the diverse databases found on the network by notifying the user of inconsistencies and changes found in step h) and updating personal information in the diverse databases according to respective data update procedures in the external database table.

* * * * *